United States Patent
Kakuta (10) Patent No.: US 10,857,841 B2
(45) Date of Patent: Dec. 8, 2020

(54) PNEUMATIC TIRE (71) Applicant: The Yokohama Rubber Co., LTD, Minato-ku, Tokyo (JP)

(72) Inventor: Shoei Kakuta, Hiratsuka (JP)

(73) Assignee: The Yokohama Rubber Co., LTD.

( * ) Notice: Subject to any disclaimer, the term of this patent is extended or adjusted under 35 U.S.C. 154(b) by 501 days.

(21) Appl. No.: 15/533,970

(22) PCT Filed: Jan. 26, 2016

(86) PCT No.: PCT/JP2016/052202
§ 371 (c)(1),
(2) Date: Jun. 7, 2017

(87) PCT Pub. No.: WO2016/121763
PCT Pub. Date: Aug. 4, 2016

(65) Prior Publication Data
US 2018/0009274 A1    Jan. 11, 2018

(30) Foreign Application Priority Data
Jan. 28, 2015 (JP) ................ 2015-014657

(51) Int. Cl.
*B60C 13/02* (2006.01)
*B60C 9/18* (2006.01)
(Continued)

(52) U.S. Cl.
CPC ............ *B60C 13/02* (2013.01); *B60C 9/1835* (2013.01); *B60C 11/005* (2013.01);
(Continued)

(58) Field of Classification Search
CPC ..... B60C 13/00; B60C 13/001; B60C 13/002; B60C 13/003; B60C 13/02; B60C 13/023; B60C 9/1835; B60C 9/185
See application file for complete search history.

(56) References Cited

U.S. PATENT DOCUMENTS 8,869,853 B2 * 10/2014 Kurosawa ............... B60C 13/02
152/523
2006/0180259 A1    8/2006 Kajita
(Continued)

FOREIGN PATENT DOCUMENTS

GB    1067856    *  3/1974
JP    H08-091017    4/1996
(Continued)

OTHER PUBLICATIONS

"Mechanics of Pneumatic Tires", Clark, Samuel, Aug. 1981.*
International Search Report for International Application No. PCT/JP2016/052202 dated Apr. 5, 2016, 4 pages, Japan.

*Primary Examiner* — Justin R Fischer
(74) *Attorney, Agent, or Firm* — Thorpe North & Western (57) ABSTRACT

A pneumatic tire includes a carcass layer, a belt layer disposed outward of the carcass layer, a tread rubber disposed outward of the belt layer in a tire radial direction, sidewall rubbers disposed outward of the carcass layer in a tire width direction, and protectors disposed in regions from tire ground contact edges to maximum tire width positions and protruding from tire profiles. The protectors have a rubber hardness $Hs\_p$ in a range of $50 \leq Hs\_p \leq 60$, an elongation at break $Eb\_p$ in a range of $500\% \leq Eb\_p \leq 700\%$, and an elastic modulus $E\_p$ in a range of $3.4 \text{ MPa} \leq E\_p \leq 7.0$ MPa.

28 Claims, 9 Drawing Sheets (51) Int. Cl.
*B60C 11/00* (2006.01)
*B60C 9/20* (2006.01)
*B60C 13/00* (2006.01)

(52) U.S. Cl.
CPC ............... *B60C 2009/2064* (2013.01); *B60C 2011/0016* (2013.01); *B60C 2011/0025* (2013.01); *B60C 2013/006* (2013.01); *B60C 2200/065* (2013.01)

(56) References Cited

U.S. PATENT DOCUMENTS

| | | | |
|---|---|---|---|
| 2012/0073719 A1 | 3/2012 | Kurosawa | |
| 2014/0326386 A1* | 11/2014 | Sato | B60C 19/086 152/525 |

FOREIGN PATENT DOCUMENTS

| | | | |
|---|---|---|---|
| JP | H08-099508 | | 4/1996 |
| JP | 2000-16032 | * | 1/2000 |
| JP | 2003-320817 | | 11/2003 |
| JP | 2006-219087 | | 8/2006 |
| JP | 20062-19087 | | 8/2006 |
| JP | 2008-254619 | | 10/2008 |
| JP | 2010-137813 | * | 6/2010 |
| JP | 2011-168219 | | 9/2011 |
| JP | 2012-066731 | | 4/2012 |
| JP | 2014-118051 | | 6/2014 |
| JP | 2014-118062 | | 6/2014 |

* cited by examiner

| | CONVENTIONAL EXAMPLE | COMPARATIVE EXAMPLE | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 | EXAMPLE 11 | EXAMPLE 12 |
|---|---|---|---|---|---|---|---|---|---|---|---|---|---|---|
| PROTECTOR | YES | NONE | YES | YES | YES | YES | YES | YES | YES | YES | YES | YES | YES | YES |
| Hs_p | 70 | - | 56 | 56 | 56 | 56 | 56 | 56 | 56 | 56 | 56 | 56 | 56 | 56 |
| Eb_p[%] | 630 | - | 620 | 620 | 620 | 620 | 620 | 620 | 620 | 620 | 620 | 620 | 620 | 620 |
| E_p[MPa] | 3.0 | - | 5.0 | 5.0 | 5.0 | 5.0 | 5.0 | 5.0 | 5.0 | 5.0 | 5.0 | 5.0 | 5.0 | 5.0 |
| H1/SW | 0.008 | - | 0.008 | 0.010 | 0.040 | 0.060 | 0.070 | 0.040 | 0.040 | 0.040 | 0.040 | 0.040 | 0.040 | 0.040 |
| Hp/SH | 0.60 | - | 0.60 | 0.60 | 0.60 | 0.60 | 0.60 | 0.70 | 0.75 | 0.80 | 0.90 | 0.75 | 0.75 | 0.75 |
| D1[mm] | -55 | - | 0 | 0 | 0 | 0 | 0 | 0 | 0 | 0 | 0 | 5.0 | 9.0 | 9.0 |
| D2[mm] | 8.0 | 8.0 | 8.0 | 8.0 | 8.0 | 8.0 | 8.0 | 8.0 | 8.0 | 8.0 | 8.0 | 8.0 | 8.0 | 17 |
| DURABILITY | 100 | 97 | 103 | 106 | 107 | 106 | 103 | 109 | 110 | 109 | 107 | 111 | 115 | 116 |

FIG. 8

CONVENTIONAL EXAMPLE

FIG. 9

PNEUMATIC TIRE

TECHNICAL FIELD

The present technology relates to a pneumatic tire, and more particularly relates to a pneumatic tire including a tire side portion with improved durability.

BACKGROUND ART

Especially, a tire for construction vehicles may sustain cut damage caused by coming into contact with rocks or the like on roads at a sidewall portion thereof when running on bad roads. Therefore, a conventional pneumatic tire includes a protector on a sidewall portion to protect the main body of the sidewall portion, thereby enhancing cut resistance of the tire. The technology disclosed in Japanese Unexamined Patent Application Publication No. H08-091017A is known as such a conventional pneumatic tire.

SUMMARY

The present technology provides a pneumatic tire including a tire side portion with improved durability.

A pneumatic tire according to the present technology includes: a carcass layer; a belt layer disposed outward of the carcass layer in a radial direction; a tread rubber disposed outward of the belt layer in the radial direction; a sidewall rubber disposed outward of the carcass layer in a tire width direction; and a protector disposed in a region from a tire ground contact edge to a maximum tire width position and protruding from a tire profile. The protector has a rubber hardness $Hs\_p$ ranging from 50 to 60, an elongation at break $Eb\_p$ ranging from 500% to 700%, and an elastic modulus $E\_p$ ranging from 3.4 MPa to 7.0 MPa.

For the pneumatic tire according to the present technology, the physical properties (rubber hardness, elongation at break, and elastic modulus) of the protector are made appropriate. This configuration has an advantage in that tire durability is improved by reducing the occurrence of cracks starting from the position where the protector is disposed while maintaining the function of the protector.

DETAILED DESCRIPTION

Embodiments of the present technology are described in detail below with reference to the drawings. However, the present technology is not limited to these embodiments. Moreover, constituents of the embodiments include elements that are replaceable while maintaining consistency with of the technology, and obviously replaceable elements. Furthermore, the modified examples described for the embodiments can be combined as desired within the scope apparent to those skilled in the art.

Pneumatic Tire

Figure 1:
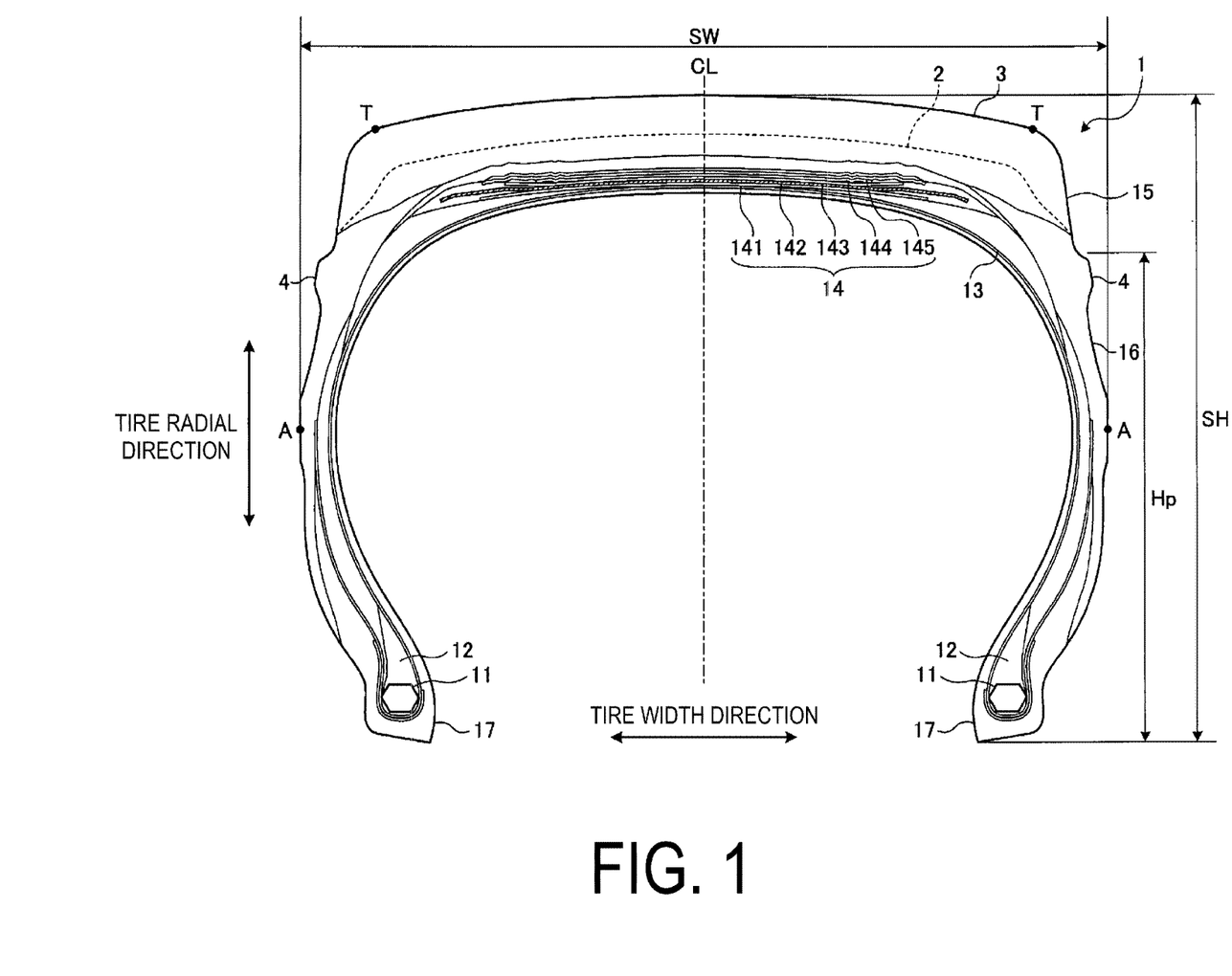
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. FIG. 1 is a cross-sectional view of a radial tire for construction vehicles, which is referred to as "Off the Road Tire (OR tire)", as an example pneumatic tire. FIG. 1 illustrates a cross section of one side in a tire radial direction of the tire taken along a lug groove. Reference sign T in FIG. 1 denotes a tire ground contact edge, and reference sign A denotes a maximum tire width position.

Note that in reference to FIG. 1, "cross section in the tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire width direction" refers to the direction parallel with the tire rotation axis. "Tire radial direction" refers to the direction perpendicular to the tire rotation axis.

The pneumatic tire 1 has an annular structure with the tire rotation axis as a center thereof and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 are annular members constituted by a plurality of bead wires bundled together. The pair of bead cores 11, 11 constitute the cores of the left and right bead portions. The pair of bead fillers 12, 12 are disposed on the peripheries of the pair of bead cores 11, 11 in the tire radial direction and reinforce the bead portions.

The carcass layer 13 extends between the left and right bead cores 11, 11 in a toroidal form, forming the framework of the tire. Additionally, both end portions of the carcass layer 13 are turned back from in to out in the tire width direction so as to wrap around the bead cores 11 and the bead fillers 12 and fixed. Also, the carcass layer 13 is constituted by a plurality of carcass cords formed from steel covered by a coating rubber and subjected to a rolling process. The carcass layer 13 has a carcass angle (inclination angle of the fiber direction of the carcass cords with respect to the tire circumferential direction), as an absolute value, of from 85 degrees to 95 degrees.

The belt layer 14 is formed by laminating three or more belt plies 141 to 145 (five belt plies in FIG. 1), and is disposed by being wound around the outer circumference of the carcass layer 13. A typical OR tire includes a belt layer 14 formed by laminating four to eight belt plies (not illustrated). The belt plies 141 to 145 are formed from steel cords covered by a coating rubber and subjected to a rolling process. The belt plies 141 to 145 each have a belt angle with a different sign from that of an adjacent belt ply, so as to be laminated with the belt cords inclining alternately in opposite directions with respect to the tire width direction. This configuration forms a crossply structure, which enhances the structural strength of the belt layer 14.

The tread rubber 15 is disposed outward of the carcass layer 13 and the belt layer 14 in the tire radial direction and constitutes a tread portion. The pair of sidewall rubbers 16, 16 are disposed outward of the carcass layer 13 in the tire width direction and constitute left and right sidewall portions. The pair of rim cushion rubbers 17, 17 are disposed inward of the left and right bead cores 11, 11 and the turned back portions of the carcass layer 13 in the tire radial direction. The pair of rim cushion rubbers 17, 17 constitute the contact surfaces of the left and right bead portions with the rim flanges.

The pneumatic tire 1 further includes a plurality of lug grooves 2 and a plurality of land portions 3 that are disposed on a tread surface.

For tires for construction vehicles, the lug grooves 2 refer to lateral grooves having a width of 10 mm or greater, for example. The lug grooves 2 extend in the tire width direction and open at the tire ground contact edges T. Here, the lug grooves 2 may extend parallel to the tire width direction or may incline with respect to the tire width direction. For example, in the configuration illustrated in FIG. 1, the lug grooves 2 pass through the tread portion in the tire width direction and open at right and left tread edges. The lug grooves 2 are disposed at predetermined intervals in the tire circumferential direction (see FIG. 3 described later).

"Tire ground contact edge T" refers to the maximum width position in the tire axial direction of the contact surface between the tire and a flat plate when the tire is mounted on a specified rim, inflated to a specified internal pressure, placed vertically on the flat plate in a static state, and loaded with a load corresponding to a specified load.

"Tread edges" refer to both end portions of the tread pattern part of the tire.

Here, "specified rim" refers to an "applicable rim" as defined by the Japan Automobile Tyre Manufacturers Association (JATMA), a "Design Rim" as defined by the Tire and Rim Association (TRA), or a "Measuring Rim" as defined by the European Tyre and Rim Technical Organisation (ETRTO).

Additionally, "specified internal pressure" refers to a "maximum air pressure" as defined by JATMA, to the maximum value in "TIRE LOAD LIMITS AT VARIOUS COLD INFLATION PRESSURES" as defined by TRA, and to "INFLATION PRESSURES" as defined by ETRTO. Additionally, "specified load" refers to a "maximum load capacity" as defined by JATMA, the maximum value in "TIRE LOAD LIMITS AT VARIOUS COLD INFLATION PRESSURES" as defined by TRA, and a "LOAD CAPACITY" as defined by ETRTO. However, in the case of JATMA, for a passenger vehicle tire, the specified internal pressure is an air pressure of 180 kPa, and the specified load is 88% of the maximum load capacity.

The land portions 3 are defined by the lug grooves 2. In the configuration illustrated in FIG. 1, the land portions 3 are formed of a row of a plurality of blocks defined by the lug grooves 2. These blocks are disposed at predetermined intervals in the tire circumferential direction (see FIG. 3 described later). Since the lug grooves 2 open at the tread edges, the land portions 3 are disposed along the tread edges in the tire circumferential direction.

Protector of Sidewall Portion

Figure 2:
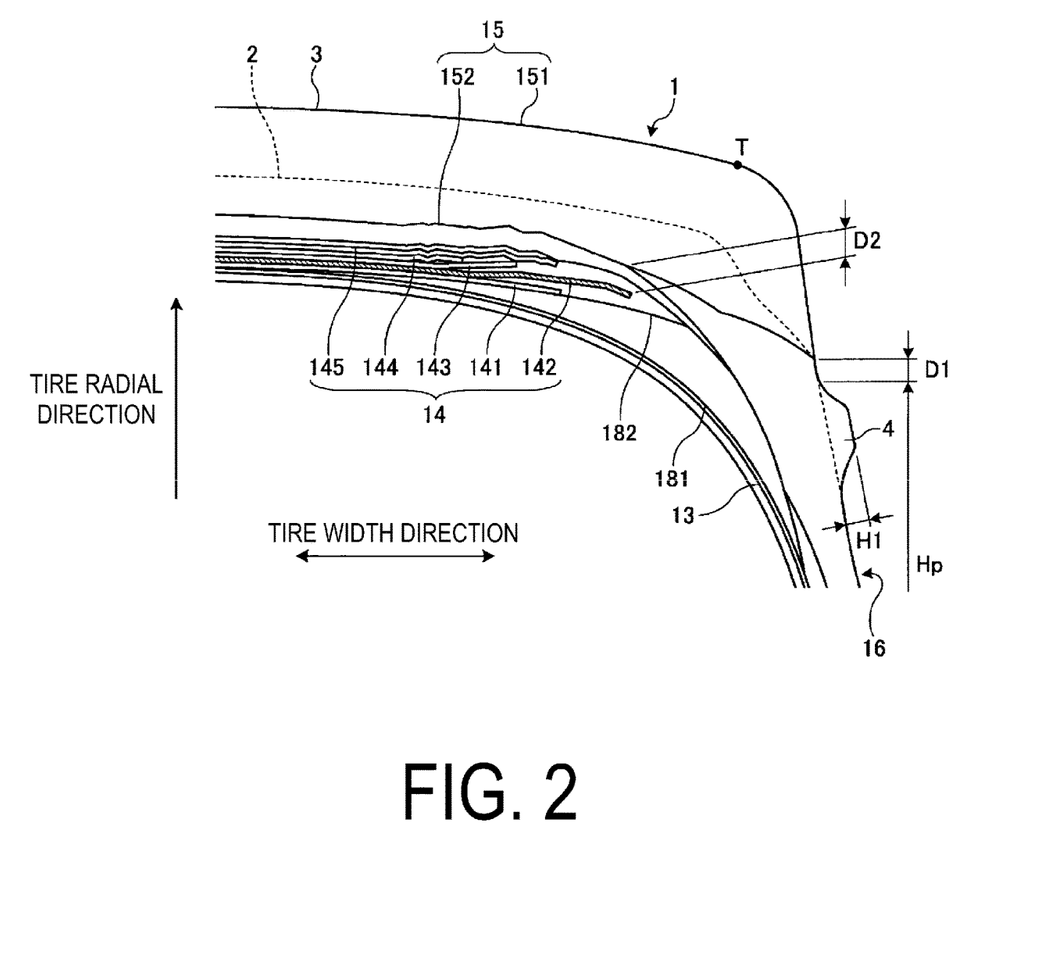
FIG. 2 is an explanatory diagram illustrating a protector of the pneumatic tire illustrated in FIG. 1.
Figure 3:
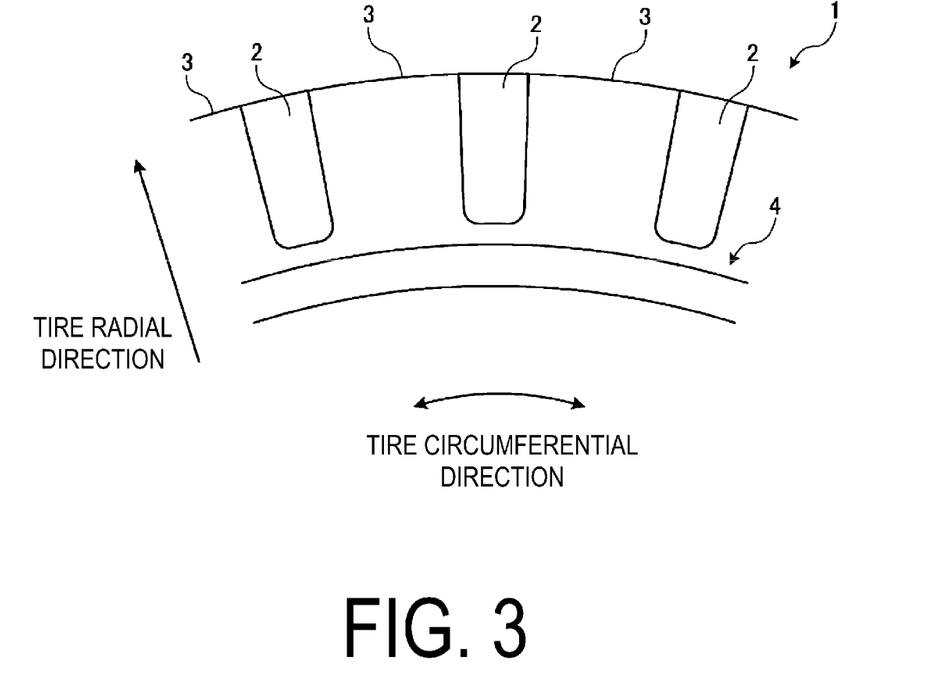
FIG. 3 is an explanatory diagram illustrating the protector of the pneumatic tire illustrated in FIG. 1.

FIGS. 2 and 3 are explanatory diagrams illustrating a protector of the pneumatic tire illustrated in FIG. 1. Of these drawings, FIG. 2 is an enlarged cross-sectional view of a shoulder portion in the tire meridian direction, and FIG. 3 is a plan view of a buttress portion.

With reference to FIGS. 2 and 3, the pneumatic tire 1 includes protectors 4 disposed on the sidewall portions. The protectors 4 reduce cut damage to the sidewall portions and thus improve cut resistance of the tire. For example, when the tire runs on a bad road, the protectors 4 protect the main bodies of the sidewall portions against rocks or the like on the road and thus prevent damage to the carcass layer 13.

The protectors 4 are each disposed in a region from the tire ground contact edge T to the maximum tire width position A. In other words, the protector 4 is disposed on the wall surface of the sidewall portion and in a region inside the tire ground contact edge T in the tire radial direction and outside the maximum tire width position A in the tire radial direction. The protector 4 protrudes from the sidewall portion and extends over the entire circumference in the tire circumferential direction.

"Maximum tire width position A" refers to the maximum width position of the tire cross-sectional width as defined by JATMA. The tire cross-sectional width is measured when the tire is mounted on the specified rim, inflated to the specified internal pressure, and in an unloaded state.

For example, in the configuration illustrated in FIGS. 2 and 3, the protector 4 has a trapezoidal shape having a short side protruding from the tire profile in a cross-sectional view in the tire meridian direction (see FIG. 2). The protector 4 has an annular structure extending continuously over the entire circumference of the tire (see FIG. 3).

The height H1 of the protector 4 and the total tire width SW preferably have a relationship of $0.01 \leq H1/SW \leq 0.06$ and more preferably $0.02 \leq H1/SW \leq 0.04$. Preferably, the height H1 of the protector 4 is 25 mm or greater, and the top of the protector 4 is not beyond the maximum tire width position A. This configuration makes the height H1 of the protector 4 appropriate.

The maximum height H1 of the protector 4 is measured by calculating the amount of protrusion of the protector 4 from a reference line (the broken line in FIG. 2) connecting the profile of the buttress portion with the profile of the sidewall portion.

The total tire width SW is measured by calculating the linear distance (including all portions such as letters and patterns on the tire side surface) between the sidewalls when the tire is mounted on the specified rim, inflated to the specified internal pressure, and in an unloaded state.

The distance Hp from the measurement point of the rim diameter to the outer end portion of the protector 4 in the tire radial direction and the cross-sectional height SH of the tire preferably have a relationship of $0.70 \leq Hp/SH \leq 0.80$ and more preferably $0.74 \leq Hp/SH \leq 0.78$ (see FIG. 1). This configuration makes the position of the outer end portion of the protector 4 in the tire radial direction appropriate.

The outer end portion of the protector 4 in the tire radial direction is defined as a point of intersection of the protector 4 and the reference line (the broken line in FIG. 2) connecting the profile of the buttress portion with the profile of the sidewall portion.

The radial width of the protector 4 (dimension symbol thereof omitted in the drawings) is preferably 30 mm or greater. This configuration ensures the function of the protector 4 and prevents an increase in the tire weight. The upper limit of the radial width is not particularly limited; however, an excessively wide radial width increases the tire weight and is not thus preferable.

The radial width of the protector 4 is measured by calculating the width in the tire radial direction with the points of intersection of the protector 4 and the reference line (the broken line in FIG. 2) connecting the profile of the buttress portion and the profile of the sidewall portion defined as measurement points.

The rubber hardness $Hs\_p$ of the protector 4 is preferably in the range of $50 \leq Hs\_p \leq 60$ and more preferably $54 \leq Hs\_p \leq 58$. This configuration makes the rubber hardness $Hs\_p$ of the protector 4 appropriate.

The rubber hardness Hs is measured by calculating JIS-A hardness in accordance with JIS-K6253.

The elongation at break $Eb\_p$ of the protector 4 is preferably in the range of $500\% \leq Eb\_p \leq 700\%$ and more preferably $600\% \leq Eb\_p \leq 650\%$. This configuration makes the elongation at break $Eb\_p$ of the protector 4 appropriate.

The elongation at break Eb is measured by performing a tensile test conforming to JIS-K7161 on a test sample of 1B shape (dumbbell shape with a thickness of 3 mm) defined in JIS-K7162, using a tensile tester (INSTRON5585H manufactured by Instron Corp.) at a tensile test speed of 2 mm/min.

The elastic modulus $E\_p$ of the protector 4 is preferably in the range of $3.4 \text{ MPa} \leq E\_p \leq 7.0 \text{ MPa}$ and more preferably $5.0 \text{ MPa} \leq E\_p \leq 6.5 \text{ MPa}$.

The elastic modulus E is measured by the following method. First, a load-elongation curve at a room temperature (25° C.) is drawn in accordance with JIS-L1017. Next, the load-elongation curve is redrawn with the vertical axis indicating "load/initial cross-sectional area" and the horizontal axis indicating "elongation/initial length". The tilt of the tangent line of the curve at a load of 67 N is defined as the elastic modulus.

The modulus $M\_p$ of the protector 4 at 100% elongation is preferably in the range of $1.5 \text{ MPa} \leq M\_p \leq 2.5 \text{ MPa}$ and more preferably $1.8 \text{ MPa} \leq M\_p \leq 2.0 \text{ MPa}$. This configuration makes the modulus $M\_p$ of the protector 4 appropriate.

The modulus (breaking strength) M is measured by performing a tensile test conforming to JIS K-6251 (using No. 3 dumbbells) on a dumbbell-shaped test sample at a temperature of 20° C.

The configuration described above makes physical properties (rubber hardness $Hs\_p$, elongation at break $Eb\_p$, elastic modulus $E\_p$, and modulus $M\_p$) of the protector 4 appropriate and thus reduces the occurrence of cracks due to deformation (for example, bending of the tire ground contact edge and tensile stress in the tire circumferential direction at the point of contact with the ground) of the protector 4 when the tire comes into contact with the ground.

For example, in the configuration illustrated in FIG. 2, the sidewall rubber 16 and the protector 4 are made from the same rubber material. Specifically, the sidewall rubber 16 and the protector 4 are composed of a single rubber member integrally molded by extrusion molding. Thus, the sidewall rubber 16 has the same physical properties (rubber hardness, elongation at break, elastic modulus, and modulus) as the protector 4 described above.

However, without being limited to such a configuration, the sidewall rubber 16 and the protector 4 may be separate members and made from mutually different rubber materials (not illustrated).

In the configuration illustrated in FIG. 2, the sidewall rubber 16 is inserted and interposed between the tread rubber 15 and the carcass layer 13. Specifically, the tread rubber 15 is formed by laminating a cap tread 151 constituting the tread surface and an undertread 152 interposed between the cap tread 151 and the belt layer 14. The pneumatic tire 1 further includes belt cushions 181 inserted between the end portions of the belt layer 14 and the carcass layer 13 and belt edge cushions 182 covering the end portions of the belt layer 14. The outer edge portion of each of the sidewall rubbers 16 in the radial direction is inserted and interposed between the cap tread 151 and the undertread 152, belt cushion 181, and belt edge cushion 182. The boundary face between the cap tread 151 and the sidewall rubber 16 is located at the buttress portion.

The cap tread 151 has a rubber hardness $Hs\_t1$ in a range of $70 \leq Hs\_t1 \leq 75$, an elongation at break $Eb\_t1$ in a range of $420\% \leq Eb\_t1 \leq 490\%$, an elastic modulus $E\_t1$ in a range of $2.8 \text{ MPa} \leq E\_t1 \leq 3.6 \text{ MPa}$, and a modulus $M\_t1$ at 100% elongation in a range of $2.0 \text{ MPa} \leq M\_t1 \leq 2.4 \text{ MPa}$.

The undertread 152 has a rubber hardness $Hs\_t2$ in a range of $60 \leq Hs\_t2 \leq 65$, an elongation at break $Eb\_t2$ in a range of $450\% \leq Eb\_t2 \leq 520\%$, an elastic modulus $E\_t2$ in a range of $2.4 \text{ MPa} \leq E\_t2 \leq 3.3 \text{ MPa}$, and a modulus $M\_t2$ at 100% elongation in a range of $1.8 \text{ MPa} \leq M\_t2 \leq 2.2 \text{ MPa}$.

The belt cushion 181 has a rubber hardness $Hs\_b1$ in a range of $52 \leq Hs\_b1 \leq 56$, an elongation at break $Eb\_b1$ in a range of $430\% \leq Eb\_b1 \leq 530\%$, an elastic modulus $E\_b1$ in a range of $3.5 \text{ MPa} \leq E\_b1 \leq 4.0 \text{ MPa}$, and a modulus $M\_b1$ at 100% elongation in a range of $1.8 \text{ MPa} \leq M\_b1 \leq 2.5 \text{ MPa}$.

The belt edge cushion 182 has a rubber hardness $Hs\_b2$ in a range of $55 \leq Hs\_b2 \leq 65$, an elongation at break $Eb\_b2$ in a range of $400\% \leq Eb\_b2 \leq 425\%$, an elastic modulus $E\_b2$ in a range of $5.0 \text{ MPa} \leq E\_b2 \leq 13.0 \text{ MPa}$, and a modulus $M\_b2$ at 100% elongation in a range of $3.0 \text{ MPa} \leq M\_b2 \leq 4.5 \text{ MPa}$.

As described above, the rubber material forming the protector 4 (and the sidewall rubber 16) has a lower rubber hardness $Hs\_p$ (which indicates that the rubber material is softer) than those of the rubber materials of the typical tread rubbers 15 (the cap tread 151 and undertread 152) and the surrounding belt cushion 181 and belt edge cushion 182, and has physical properties excellent in bending fatigue resistance and difficult to cause aging and deterioration. This configuration reduces the occurrence of cracks starting from the disposed position of the protector 4.

The rubber members covering the belt layer 14 (the undertread 152, belt cushion 181, and belt edge cushion 182 in FIG. 2) are preferably formed of a rubber material having lower heat build-up than that of the sidewall rubber 16. Specifically, the loss tangent $\tan \delta\_x$ of the rubber members covering the belt layer 14 and the loss tangent $\tan \delta\_s$ of the sidewall rubber preferably have a relationship of $0.1 \leq \tan \delta\_s - \tan \delta\_x$.

The loss tangent is measured using a viscoelastic spectrometer manufactured by Toyo Seiki Seisaku-sho, Ltd., under conditions of a temperature of 60° C., a shearing strain of 10%, an amplitude of ±0.5%, and a frequency of 20 Hz.

The distance D1 in the tire radial direction between the outer end portion of the protector 4 in the tire radial direction and the outer end portion of the sidewall rubber 16 in the tire radial direction on the tire surface (the boundary portion between the cap tread 151 and the sidewall rubber 16) is preferably 5.0 mm or greater and more preferably 8.0 mm or greater. This configuration makes the distance D1 between the protector 4 and the boundary portion between the cap tread 151 and the sidewall rubber 16 appropriate. In the configuration having the sidewall rubber 16 and the protector 4 that are integrally molded, the distance D1 is logically 0 mm or greater.

The distance D1 is measured when the tire is mounted on the specified rim, inflated to the specified internal pressure, and in an unloaded state.

The shortest distance D2 between the sidewall rubber 16 and the edge portion of the widest belt ply 142 constituting the belt layer 14 is preferably 10 mm or greater and more preferably 17 mm or greater.

The distance D2 is measured when the tire is mounted on the specified rim, inflated to the specified internal pressure, and in an unloaded state. Specifically, the distance D2 is measured by calculating the shortest distance between the outer edge portion of the sidewall rubber 16 in the radial direction and the edge portion of the widest belt ply 142.

Modified Examples

Figure 4:
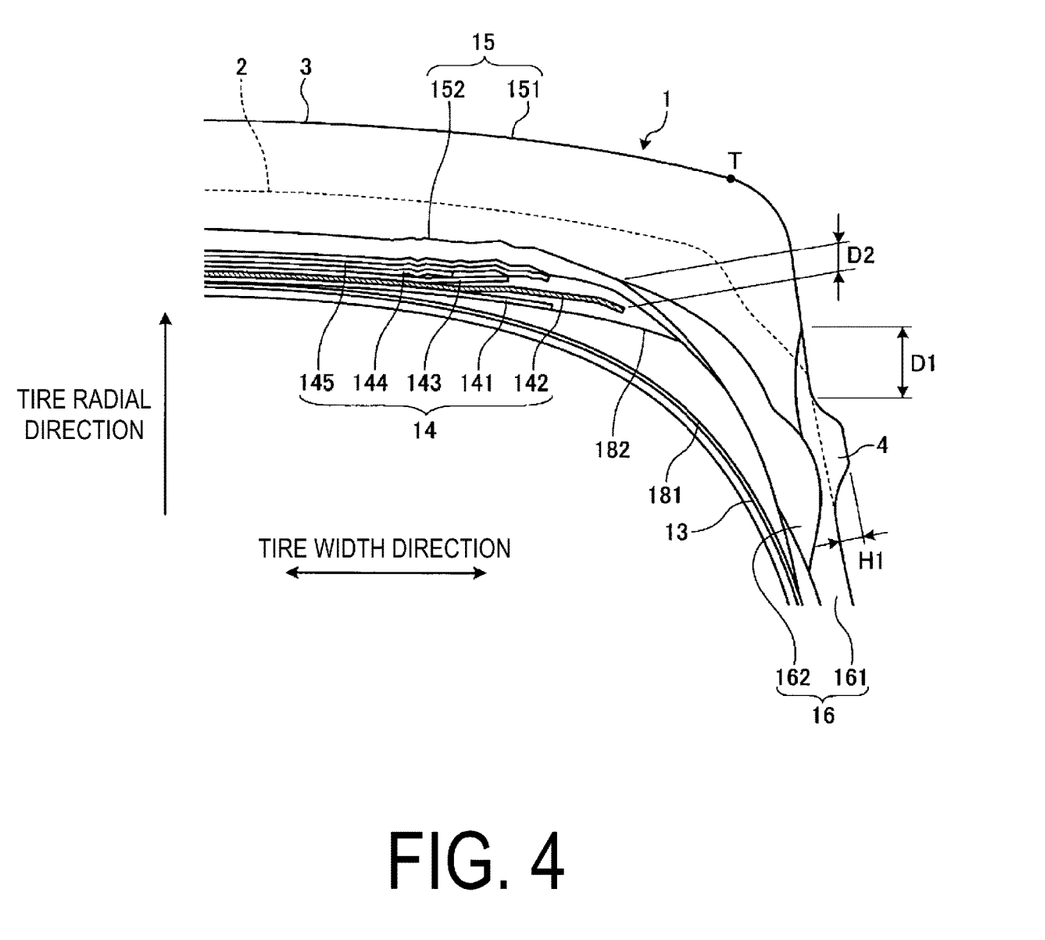
FIG. 4 is an explanatory diagram illustrating a modified example of the pneumatic tire illustrated in FIG. 1.

FIG. 4 is an explanatory diagram illustrating a modified example of the pneumatic tire illustrated in FIG. 1. FIG. 4 is an enlarged cross-sectional view of a shoulder portion in the tire meridian direction.

In the configuration illustrated in FIG. 1, the sidewall rubbers 16 are each inserted and interposed between the tread rubber 15 and the carcass layer 13 as illustrated in FIG. 2.

However, without being limited to such a configuration, the outer edge portion of the sidewall rubber 16 in the radial direction may be exposed on the tire surface while covering the edge portion of the tread rubber 15 from the outside in the tire width direction as illustrated in FIG. 4. For example, in the configuration illustrated in FIG. 4, the sidewall rubber 16 includes an outer side rubber 161 exposed on the tire surface and an inner side rubber 162 inserted into the tire. These rubbers 161, 162 are made from the same rubber material and have the same physical properties. The protector 4 is disposed on the outer surface of the outer side rubber 161. The inner side rubber 162 is inserted and interposed between the cap tread 151 and the undertread 152, belt cushion 181, and belt edge cushion 182.

Figure 5:
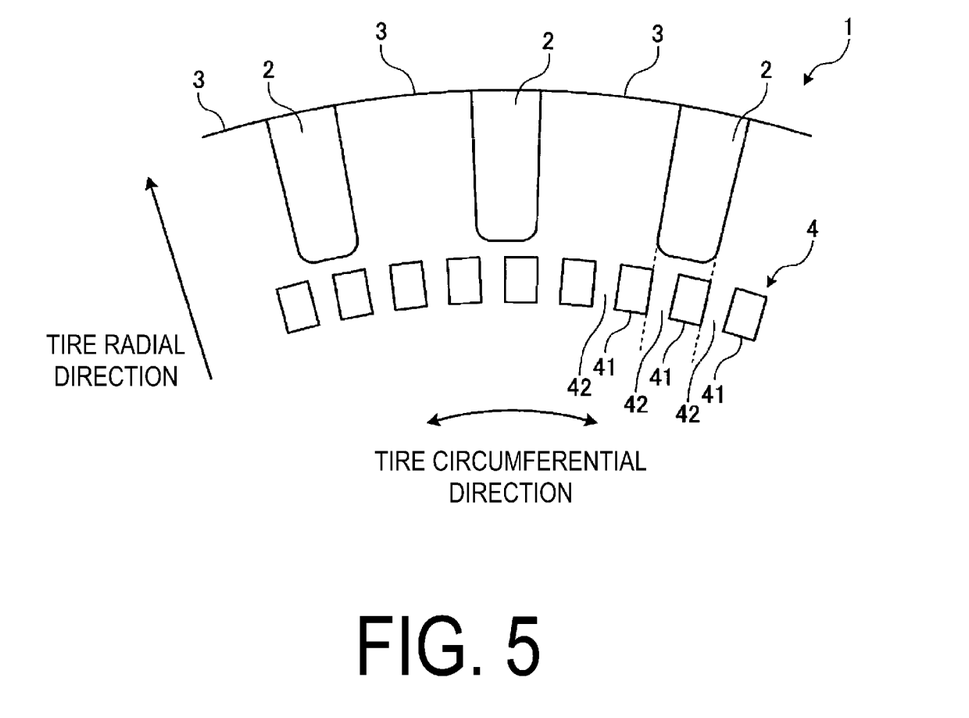
FIG. 5 is an explanatory diagram illustrating a modified example of the pneumatic tire illustrated in FIG. 1.
Figure 6:
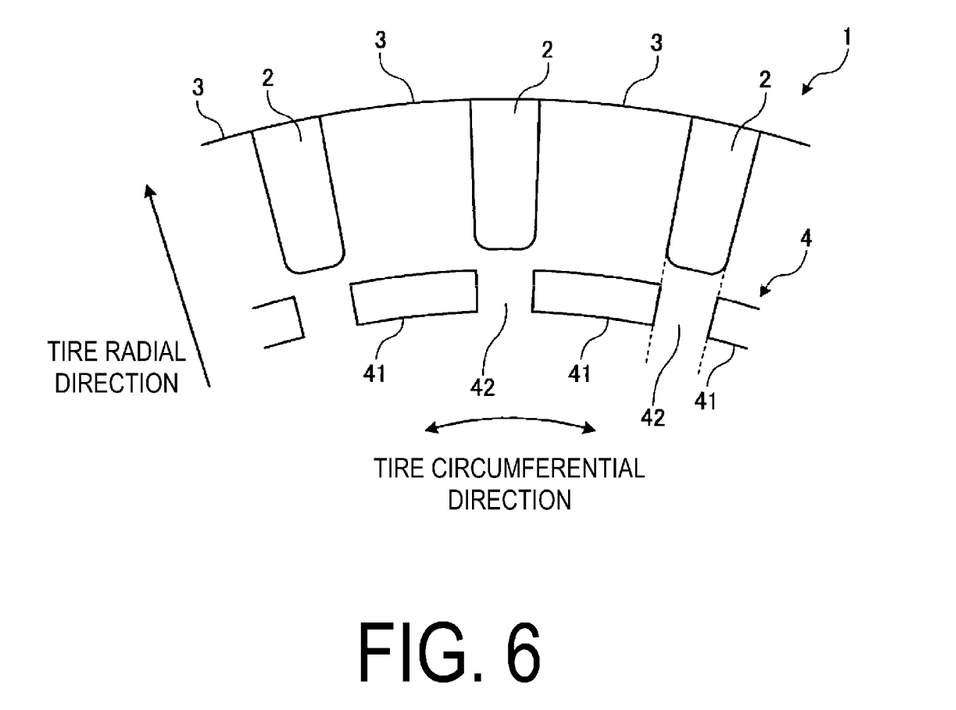
FIG. 6 is an explanatory diagram illustrating a modified example of the pneumatic tire illustrated in FIG. 1.
Figure 7:
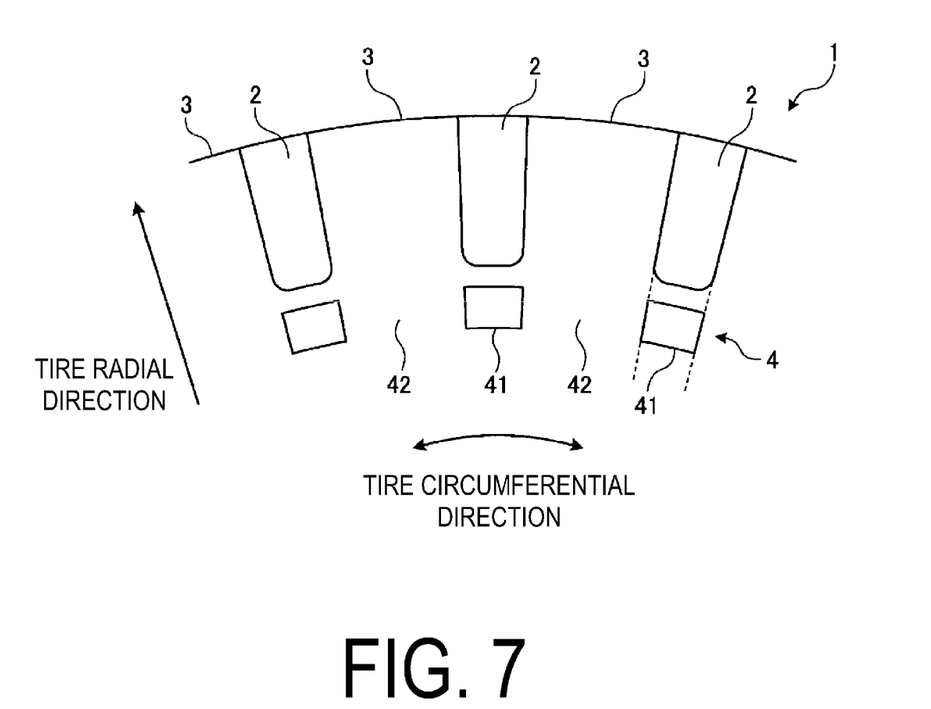
FIG. 7 is an explanatory diagram illustrating a modified example of the pneumatic tire illustrated in FIG. 1.

FIGS. 5 to 7 are explanatory diagrams illustrating modified examples of the pneumatic tire illustrated in FIG. 1. FIGS. 5 to 7 illustrate plan views of buttress portions.

In the configuration illustrated in FIG. 1, the protector 4 has a continuous annular structure in the tire circumferential direction as illustrated in FIG. 3. This configuration allows the protector 4 to be a continuous rib over the entire circumference of the tire, which is preferable in that the strength of the protector 4 is enhanced.

However, without being limited to such a configuration, the protector 4 may be composed of a plurality of blocks 41 aligned discontinuously in the tire circumferential direction as illustrated in FIGS. 5 to 7. This configuration causes the protector 4 to be divided in the tire circumferential direction and thus reduces the occurrence of cracks due to deformation (for example, bending of the tire ground contact edge and tensile stress in the tire circumferential direction at the point of contact with the ground) of the protector 4 when the tire comes into contact with the ground.

For example, in each of the configurations illustrated in FIGS. 5 to 7, the protector 4 includes a plurality of grooves 42 passing through the protector 4 in the tire radial direction. These grooves 42 divide the protector 4 at predetermined intervals in the tire circumferential direction into a row of the blocks 41. In the configuration illustrated in FIG. 5, the disposal pitch and circumferential length of the blocks 41 of the protector 4 are less than the width of the lug grooves 2 of the tread portion, which causes both the blocks 41 and grooves 42 of the protector 4 to be located in regions extending from the lug grooves 2 and having the same width as that of the lug grooves 2. In the configuration illustrated in FIG. 6, the grooves 42 of the protector 4 are located only in the regions extending from the lug grooves 2 of the tread portion and having the same width as that of the lug grooves 2, and are not located in positions corresponding to the land portions 3 of the tread portion. The blocks 41 are located outside the regions obtained by extending the lug grooves 2 while maintaining the width and are disposed continuously in the entire regions corresponding to the land portions 3 of the tread portion in the tire circumferential direction. In contrast, in the configuration illustrated in FIG. 7, the grooves 42 of the protector 4 are outside the regions extending from the lug grooves 2 of the tread portion and having the same width as that of the lug grooves 2, and are disposed continuously in the entire regions corresponding to the land portions 3 of the tread portion. The blocks 41 are disposed in the entire regions extending from the lug grooves 2 and having the same width as that of the lug grooves 2, and are not disposed in the regions corresponding to the land portions 3 of the tread portion.

Effects

As described above, the pneumatic tire 1 includes the carcass layer 13, the belt layer 14 disposed outward of the carcass layer 13 in the radial direction, the tread rubber 15 disposed outward of the belt layer 14 in the radial direction, the sidewall rubbers 16 disposed outward of the carcass layer 13 in the tire width direction, and the protectors 4 disposed in the regions from the tire ground contact edges T to the maximum tire width positions A and protruding from the tire profiles (see FIGS. 1 to 3). The protectors 4 have a rubber hardness $Hs\_p$ in a range of $50 \leq Hs\_p \leq 60$, an elongation at break $Eb\_p$ in a range of $500\% \leq Eb\_p \leq 700\%$, and an elastic modulus $E\_p$ in a range of $3.4 \text{ MPa} \leq E\_p \leq 7.0 \text{ MPa}$.

In tires for construction vehicles including protectors on tire side portions, bending deformation at the tire ground contact edges and tensile stress in the tire circumferential direction at the point of contact with the ground act on the protectors when the tires deform while running on bad roads. Then, a problem arises that cracks occur, starting from cut damage to the surfaces of the protectors (cut damage caused due to the original function of the protectors protecting the tire side portions), and grow along the boundary face between the tire members toward the inside of the tire. For example, such a crack may grow along the boundary face between the cap tread and the sidewall rubber to the vicinity of the end portion of the belt layer.

Regarding this problem, in the pneumatic tire 1, the physical properties (rubber hardness $Hs\_p$, elongation at break $Eb\_p$, and elastic modulus $E\_p$) of the protectors 4 are made appropriate as described above. Specifically, the rubber material forming the protectors 4 (and the sidewall rubbers 16) has a lower rubber hardness $Hs\_p$ than those of the rubber materials of the typical tread rubbers 15 (the cap tread 151 and the undertread 152) and the surrounding belt cushions 181 and belt edge cushions 182, and has physical properties excellent in bending fatigue resistance and difficult to cause aging and deterioration. This configuration has an advantage in that tire durability is improved by reducing the occurrence of cracks starting from the disposed positions of the protectors 4 while maintaining the function of the protectors 4.

Specifically, a rubber hardness $Hs\_p$ of 50 or greater ensures the strength of the protectors 4, thereby appropriately protecting the tire side portions. A rubber hardness $Hs\_p$ of 60 or less reduces the occurrence of cracks due to an excess rubber hardness $Hs\_p$ of the protectors 4. An elongation at break $Eb\_p$ of 500% or greater reduces the occurrence of cracks due to insufficient strength of the protectors 4. An elongation at break $Eb\_p$ of 700% or less ensures the strength of the protectors 4, thereby appropriately protecting the tire side portions. An elastic modulus $E\_p$ of 3.4 MPa or greater ensures the strength of the protectors 4, thereby appropriately protecting the tire side portions. An elastic modulus $E\_p$ of 7.0 MPa or less ensures the elasticity of the protectors 4, thereby reducing the occurrence of cracks starting from the protectors 4.

The pneumatic tire 1 includes the sidewall rubbers 16 and the protectors 4 that are made from the same rubber material (see FIG. 2). In this configuration, the protectors 4, which have the same physical properties as the sidewall rubbers 16, have a lower rubber hardness Hs_p than those of the rubber materials of the typical tread rubbers 15 (the cap tread 151 and the undertread 152) and the surrounding belt cushions 181 and belt edge cushions 182, and have physical properties excellent in bending fatigue resistance and difficult to cause aging and deterioration. This configuration has an advantage in that the occurrence of cracks starting from the disposed positions of the protectors 4 is reduced while the function of the protectors 4 is maintained.

In the pneumatic tire 1, each of the sidewall rubbers 16 and each of the protectors 4 are composed of an integrally molded single member (see FIG. 2). This configuration facilitates the step for molding the green tire in comparison with the configuration having the sidewall rubbers 16 and the protectors 4 composed of separate members (not illustrated).

In the pneumatic tire 1, the distance D1 between the outer end portion of each of the protectors 4 in the tire radial direction and the outer end portion of the corresponding sidewall rubber 16 in the tire radial direction on the tire surface is 5.0 mm or greater (see FIG. 2). This configuration ensures the distance D1 between the protectors 4 and the boundary face between the sidewall rubbers 16 and the cap tread 151. This configuration thus has an advantage in that the occurrence of cracks starting from the disposed positions of the protectors 4 is effectively reduced.

In the pneumatic tire 1, the rubber members covering the edge portions of the belt plies 141 to 145 constituting the belt layer 14 (for example, the undertread 152, belt cushion 181, and belt edge cushion 182 in FIG. 2) have lower heat build-up than those of the sidewall rubbers 16. This configuration has an advantage in that separation of surrounding rubber starting from the edge portions of the belt plies 141 to 145 is reduced by reducing deterioration of the rubber members covering the edge portions of the belt plies 141 to 145.

In the pneumatic tire 1, the height H1 of the protectors 4 (see FIG. 2) and the total tire width SW (see FIG. 1) have a relationship of $0.01 \leq H1/SW \leq 0.06$. This configuration has an advantage in that the height H1 of the protectors is made appropriate. In other words, a relationship of $0.01 \leq H1/SW$ has an advantage in that the height H1 of the protectors 4 is made appropriate. That is, a relationship of $0.01 \leq H1/SW$ ensures the height H1 of the protectors 4 and thus ensures the function of the protectors 4 that protects the tire side portions. A relationship of $H1/SW \leq 0.06$ reduces the occurrence of cracks due to an excess size of the protectors 4 and prevents an increase in the tire weight.

In the pneumatic tire 1, the distance Hp from the measurement point of the rim diameter at each of the bead heel portions to the outer end portion of the corresponding protector 4 in the tire radial direction and the cross-sectional height SH of the tire have a relationship of $0.70 \leq Hp/SH \leq 0.80$ (see FIG. 1). This configuration has an advantage in that the outer end portions of the protectors 4 in the tire radial direction are in appropriate positions. That is, a relationship of $0.70 \leq Hp/SH$ prevents the protectors 4 from being damaged due to the positions of the protectors 4 being too close to a road surface. A relationship of $Hp/SH \leq 0.80$ ensures the function of the protectors 4 that protects the tire side portions.

In the pneumatic tire 1, the shortest distance D2 between the sidewall rubbers 16 and the edge portions of the widest belt ply 142 constituting the belt layer 14 is 10 mm or greater (see FIG. 2). This configuration has an advantage in that the occurrence of cracks starting from the edge portions of the belt ply 142 is reduced by ensuring the distances D2 from the edge portions of the belt ply 142 to the soft sidewall rubbers 16.

The pneumatic tire 1 includes the protectors 4 having a continuous annular structure in the tire circumferential direction (see FIG. 3). This configuration has an advantage in that the highly rigid protectors 4 have an improved function of protecting the tire side portions.

The pneumatic tire 1 includes the protectors 4 each composed of the blocks 41 aligned discontinuously in the tire circumferential direction (see FIGS. 5 to 7). This configuration has an advantage in that the occurrence of cracks is reduced by reducing deformation (for example, bending of the tire ground contact edges and tensile stress in the tire circumferential direction at the point of contact with the ground) of the protectors 4 when the tire comes into contact with the ground.

Target of Application

The pneumatic tire 1 is preferably applied to radial tires for construction vehicles. Radial tires for construction vehicles are fitted to construction vehicles traveling on uneven ground, such as a civil engineering construction site. Construction vehicles include large dump trucks, tire rollers, scrapers, graders, cranes, and wheel loaders.

However, without being limited to such a configuration, the pneumatic tire 1 may be applied to heavy duty radial tires fitted to trucks, buses, or the like (not illustrated).

EXAMPLES

Figure 8:
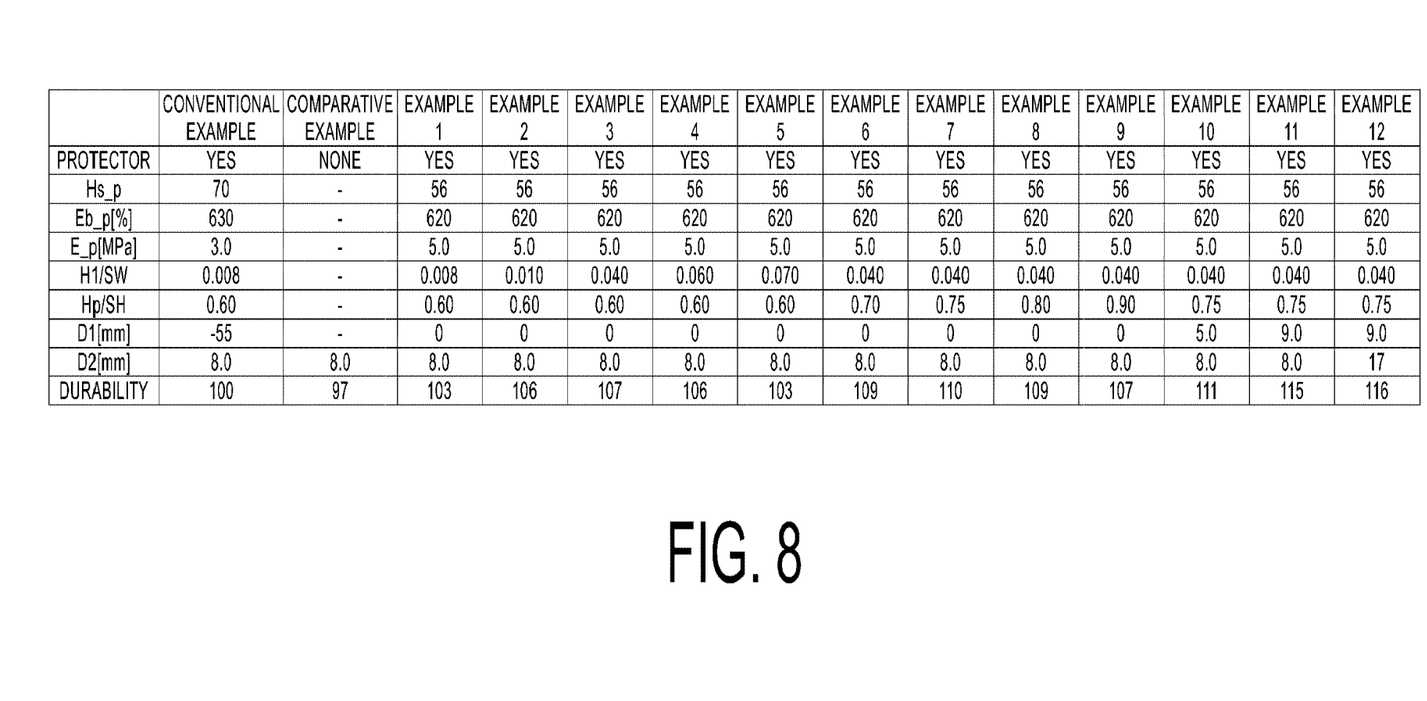
FIG. 8 is a table showing results of a performance test on pneumatic tires according to the embodiment of the present technology.
Figure 9:
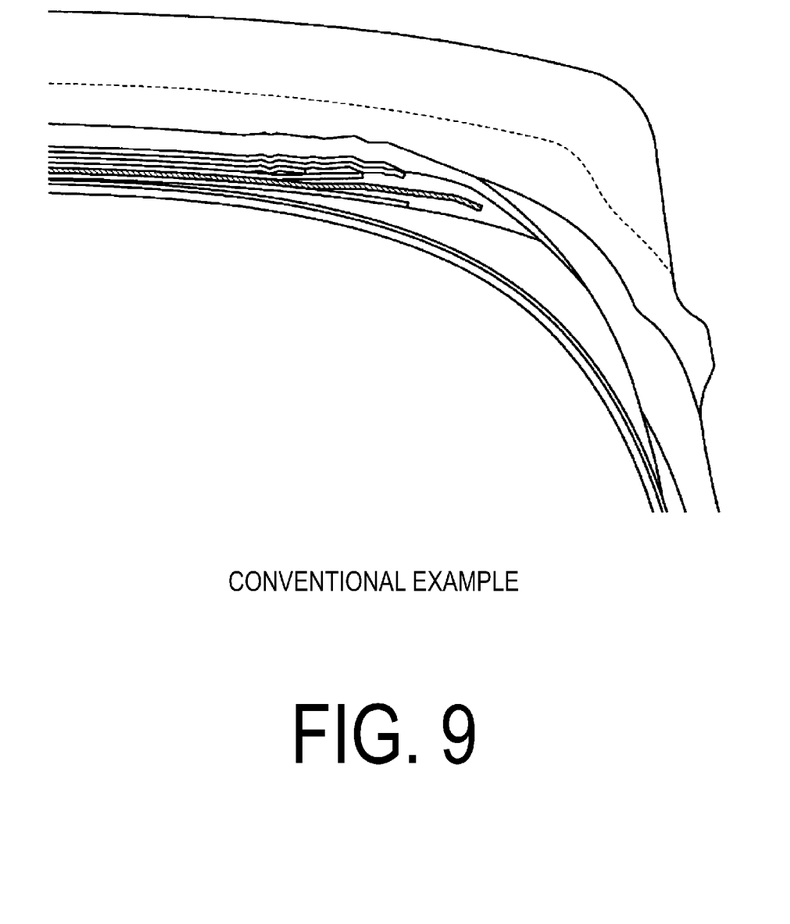
FIG. 9 is an explanatory diagram illustrating a conventional pneumatic tire.

FIG. 8 is a table showing results of a performance test on the pneumatic tires according to the embodiments of the present technology. FIG. 9 is an explanatory diagram illustrating a conventional pneumatic tire.

In the performance test, a plurality of types of test tires were evaluated for durability of their tire side portions. Test tires with a tire size of 29.5R25 were assembled on applicable rims defined by JATMA; inflated to a maximum air pressure; and had a maximum load defined by JATMA applied thereto. The test tires were fitted to all wheels of a construction vehicle to be tested.

For the evaluation for the durability, the test vehicle traveled 10000 km on a bad road with rocks and debris. Thereafter, the number and size of cuts and cracks generated at the protectors were measured. Then, the measurement results were expressed as index values with the result of Conventional Example being defined as the reference (100). A higher value indicates better performance.

The test tires of Examples 1 to 12 had the configuration illustrated in FIGS. 1 to 3 and included the protectors 4 on the tire side portions. The total tire width SW was 760 mm, and the tire cross-sectional height SH was 619 mm. The protectors 4 and the sidewall rubbers 16 had an integrated structure as illustrated in FIG. 2 and the same physical properties.

The test tire of Conventional Example had the same configuration as that of Example 1 except that the protectors 4 and the cap tread 151 had an integrated structure and the same physical properties. The test tire of Comparative Example had the same configuration as that of Example 1 except that the protectors 4 were not provided.

As is clear from the test results, the test tires of Examples 1 to 12 demonstrate improved durability of the tire side portions.

The invention claimed is:

1. A pneumatic tire comprising:
a carcass layer;
a belt layer disposed outward of the carcass layer in a radial direction, the belt layer being a laminate of from four to eight belt plies;
belt cushions inserted between end portions of the belt layer and the carcass layer;
belt edge cushions covering the end portions of the belt layer;
a tread rubber disposed outward of the belt layer in the radial direction;
a sidewall rubber disposed outward of the carcass layer in a tire width direction; and
a protector disposed in a region from a tire ground contact edge to a maximum tire width position and protruding from a tire profile;
the protector having a rubber hardness $Hs\_p$ ranging from 50 to 60, an elongation at break $Eb\_p$ ranging from 500% to 700%, an elastic modulus $E\_p$ ranging from 3.4 MPa to 7.0 MPa, and a maximum height H1 of 25 mm or greater; and
the belt cushions having a rubber hardness $Hs\_b1$ in a range of $52 \leq Hs\_b1 \leq 56$, an elongation at break $Eb\_b1$ in a range of $430\% \leq Eb\_b1 \leq 530\%$ and an elastic modulus $E\_b1$ in a ran e of $3.5 \leq MPa\ E\_b1 \leq 4.0$ MPa.

2. The pneumatic tire according to claim 1, wherein the sidewall rubber and the protector are made from an identical rubber material.

3. The pneumatic tire according to claim 2, wherein the sidewall rubber and the protector are formed of an integrally molded single member.

4. The pneumatic tire according to claim 3, wherein a distance D1 between an outer end portion of the protector in the radial direction and an outer end portion of the sidewall rubber in the radial direction on a tire surface is 5.0 mm or greater.

5. The pneumatic tire according to claim 4, wherein a rubber member covering an edge portion of a belt ply constituting the belt layer is formed of a rubber material having lower heat build-up than heat build-up of the sidewall rubber.

6. The pneumatic tire according to claim 5, wherein the height H1 of the protector and a total tire width SW have a relationship of $0.01 \leq H1/SW \leq 0.06$.

7. The pneumatic tire according to claim 6, wherein a distance Hp from a measurement point of a rim diameter to the outer end portion of the protector in the radial direction and a tire cross-sectional height SH have a relationship of $0.70 \leq Hp/SH \leq 0.80$.

8. The pneumatic tire according to claim 7, wherein a shortest distance D2 between the sidewall rubber and an edge portion of a widest belt ply constituting the belt layer is 10 mm or greater.

9. The pneumatic tire according to claim 8, wherein the protector has a continuous annular structure in a tire circumferential direction.

10. The pneumatic tire according to claim 8, wherein the protector is formed of a plurality of blocks aligned discontinuously in a tire circumferential direction.

11. The pneumatic tire according to claim 10 is a tire for construction vehicles.

12. The pneumatic tire according to claim 1, wherein a distance D1 between an outer end portion of the protector in the radial direction and an outer end portion of the sidewall rubber in the radial direction on a tire surface is 5.0 mm or greater.

13. The pneumatic tire according to claim 1, wherein a rubber member covering an edge portion of a belt ply constituting the belt layer is formed of a rubber material having lower heat build-up than heat build-up of the sidewall rubber.

14. The pneumatic tire according to claim 1, wherein the height H1 of the protector and a total tire width SW have a relationship of $0.01 \leq H1/SW \leq 0.06$.

15. The pneumatic tire according to claim 1, wherein a distance Hp from a measurement point of a rim diameter to an outer end portion of the protector in the radial direction and a tire cross-sectional height SH have a relationship of $0.70 \leq Hp/SH \leq 0.80$.

16. The pneumatic tire according to claim 1, wherein a shortest distance D2 between the sidewall rubber and an edge portion of a widest belt ply constituting the belt layer is 10 mm or greater.

17. The pneumatic tire according to claim 1, wherein the protector has a continuous annular structure in a tire circumferential direction.

18. The pneumatic tire according to claim 1, wherein the protector is formed of a plurality of blocks aligned discontinuously in a tire circumferential direction.

19. The pneumatic tire according to claim 1 is a tire for construction vehicles.

20. The pneumatic tire according to claim 1, wherein the elastic modulus $E\_p$ ranges from 5.0 MPa to 7.0 MPa.

21. The pneumatic tire according to claim 1, wherein the sidewall rubber is inserted and interposed between the tread rubber and the carcass layer.

22. The pneumatic tire according to claim 1, wherein the protector has a modulus $M\_p$ at 100% elongation ranging from 1.5 MPa to 2.5 MPa.

23. The pneumatic tire according to claim 1, wherein:
the pneumatic tire is a construction vehicle tire;
the belt layer is formed by laminating four to eight belt plies formed from steel cords covered by a coating rubber and subjected to a rolling process; and
the height H1 of the protector and a total tire width SW have a relationship of $0.02 \leq H1/SW \leq 0.06$.

24. The pneumatic tire according to claim 1, wherein the belt plies of the belt layer are formed from steel cords covered by a coating rubber and subjected to a rolling process.

25. The pneumatic tire according to claim 1, wherein a top of the protector in the radial direction does not extend beyond the maximum tire width position.

26. The pneumatic tire according to claim 1, wherein the belt edge cushions have a rubber hardness $Hs\_b2$ in a range of $55 \leq Hs\_b2 \leq 65$, an elongation at break $Eb\_b2$ in a range of $400\% \leq Eb\_b2 \leq 425\%$ and an elastic modulus $E\_b2$ in a range of $5.0\ MPa \leq E\_b2 \leq 13.0$ MPa.

27. The pneumatic tire according to claim 1, wherein the sidewall rubber is inserted and interposed between the tread rubber, and the carcass layer and belt edge cushions.

28. A pneumatic tire comprising:
a carcass layer;

a belt layer disposed outward of the carcass layer in a radial direction, the belt layer being a laminate of from four to eight belt plies;

belt cushions inserted between end portions of the belt layer and the carcass layer;

belt edge cushions covering the end portions of the belt layer;

a tread rubber disposed outward of the belt layer in the radial direction;

a sidewall rubber disposed outward of the carcass layer in a tire width direction; and a protector disposed in a region from a tire ground contact edge to a maximum tire width position and protruding from a tire profile;

the protector having a rubber hardness $Hs\_p$ ranging from 50 to 60, an elongation at break $Eb\_p$ ranging from 500% to 700%, an elastic modulus $E\_p$ ranging from 3.4 MPa to 7.0 MPa, and a maximum height $H1$ of 25 mm or greater; and the belt edge cushions having a rubber hardness $Hs\_b2$ in a range of $55 \leq Hs\_b2 \leq 65$, an elongation at break $Eb\_b2$ in a range of $400\% \leq Eb\_b2 \leq 425\%$ and an elastic modulus $E\_b2$ in a range of $5.0 \text{ MPa} \leq E\_b2 \leq 13.0 \text{ MPa}$.

* * * * *